US009214695B2

(12) United States Patent
Wang et al.

(10) Patent No.: US 9,214,695 B2
(45) Date of Patent: Dec. 15, 2015

(54) HYBRID ANODES FOR REDOX FLOW BATTERIES

(71) Applicant: BATTELLE MEMORIAL INSTITUTE, Richland, WA (US)

(72) Inventors: Wei Wang, Kennewick, WA (US); Jie Xiao, Richland, WA (US); Xiaoliang Wei, Richland, WA (US); Jun Liu, Richland, WA (US); Vincent L. Sprenkle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 80 days.

(21) Appl. No.: 14/166,389

(22) Filed: Jan. 28, 2014

(65) Prior Publication Data

US 2014/0141291 A1 May 22, 2014

Related U.S. Application Data

(63) Continuation-in-part of application No. 13/532,206, filed on Jun. 25, 2012, and a continuation-in-part of application No. 13/912,516, filed on Jun. 7, 2013, and a continuation-in-part of application No. 13/439,083, filed on Apr. 4, 2012, now Pat. No. 9,130,218.

(51) Int. Cl.
*H01M 6/04* (2006.01)
*H01M 8/18* (2006.01)
(Continued)

(52) U.S. Cl.
CPC ............... *H01M 8/188* (2013.01); *B82Y 30/00* (2013.01); *H01M 4/13* (2013.01); *H01M 4/38* (2013.01);
(Continued)

(58) Field of Classification Search
CPC ....... H01M 8/18; H01M 8/2258; H01M 4/13; H01M 4/38; H01M 4/405; H01M 4/485; H01M 4/5815; H01M 4/587; H01M 8/188; H01M 8/225; B82Y 30/00; Y02E 60/122; Y02E 60/528
USPC .......................................... 429/105
See application file for complete search history.

(56) References Cited

U.S. PATENT DOCUMENTS 5,436,093 A 7/1995 Huang et al.
6,143,443 A * 11/2000 Kazacos ............... H01M 8/188
429/188

(Continued)

FOREIGN PATENT DOCUMENTS

JP 2011-086554 A 4/2011

OTHER PUBLICATIONS

International Search Report/Written Opinion for International Application No. PCT/US2014/015696, International Filing Date, Feb. 11, 2014, Date of Mailing Jun. 9, 2014.
(Continued)

*Primary Examiner* — Milton I Cano
*Assistant Examiner* — Jimmy K Vo
(74) *Attorney, Agent, or Firm* — Klarquist Sparkman, LLP

(57) ABSTRACT

RFBs having solid hybrid electrodes can address at least the problems of active material consumption, electrode passivation, and metal electrode dendrite growth that can be characteristic of traditional batteries, especially those operating at high current densities. The RFBs each have a first half cell containing a first redox couple dissolved in a solution or contained in a suspension. The solution or suspension can flow from a reservoir to the first half cell. A second half cell contains the solid hybrid electrode, which has a first electrode connected to a second electrode, thereby resulting in an equipotential between the first and second electrodes. The first and second half cells are separated by a separator or membrane.

38 Claims, 16 Drawing Sheets

(51) Int. Cl.
  *H01M 4/13*   (2010.01)
  *H01M 4/38*   (2006.01)
  *H01M 4/40*   (2006.01)
  *H01M 4/485*  (2010.01)
  *H01M 4/58*   (2010.01)
  *H01M 4/587*  (2010.01)
  *B82Y 30/00*  (2011.01)
  *H01M 8/22*   (2006.01)

(52) U.S. Cl.
  CPC .............. *H01M 4/405* (2013.01); *H01M 4/485* (2013.01); *H01M 4/587* (2013.01); *H01M 4/5815* (2013.01); *H01M 8/225* (2013.01); *Y02E 60/122* (2013.01); *Y02E 60/528* (2013.01)

(56) References Cited

U.S. PATENT DOCUMENTS

2011/0189520 A1* 8/2011 Carter ................. B60L 11/1879
                                                     429/107
2012/0135278 A1   5/2012 Yoshie et al.

OTHER PUBLICATIONS

Wang, Wei, et al., "Anthraquinone with tailored structure for a nonaqueous metal-organic redox flow battery," Chemical Communications, 2012, vol. 48, No. 53, pp. 6669-6671, Richland, WA, USA.

* cited by examiner

Scheme 1

HYBRID ANODES FOR REDOX FLOW BATTERIES

CROSS-REFERENCE TO RELATED APPLICATIONS

This application is a continuation in part of currently pending U.S. patent application Ser. No. 13/532,206 filed on Jun. 25, 2012 and of currently pending U.S. patent application Ser. No. 13/912,516 filed on Jun. 7, 2013, which is a continuation in part of U.S. patent application Ser. No. 13/439,083 filed on Apr. 4, 2012, now U.S. Pat. No. 9,130,218B2. The disclosures of the related applications are incorporated herein by reference.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Practical implementation of a number of important technologies has been slowed by limitations in state-of-the-art energy storage devices. For instance, energy storage devices having electrodes comprising metals, such as Li, Na, Zn, Si, Mg, Al, Sn, and Fe, often face the challenges of dendrite growth and unstable solid electrolyte interface (SEI) layers, which can lead to cell shorting and combustion—thus presenting a major safety concern, especially at high charge rates (current density). In one example, lithium sulfur based redox flow batteries (RFB) using lithium metal as an anode and a $Li_xS_y$ solvent or suspension electrolyte as a catholyte are attractive because of the large specific capacity and energy density. However the formation of soluble long chain polysulfides during charge/discharge can lead to the gradual loss of active mass from the cathode into the electrolyte and onto the lithium anode, continuously forming a passivation film. As a result, severe self-discharge and capacity decay upon cycling are usually observed, hindering the practical application of lithium sulfur batteries. In another example, Li-based nonaqueous RFBs, which can exhibit high energy density and high energy efficiency, can suffer from relatively unstable anodes that limit the cycle life of the RFB. The anode instability can be caused by dendrite growth and/or failure of the solid electrolyte interface (SEI) layer. Traditional approaches of using electrolyte additives or physical barriers to protect the metal anode are often inadequate for the operating conditions possible in certain RFBs. For example, some Li-based nonaqueous RFBs can operate at current densities that are at least ten times higher than conventional, non-flowing lithium-ion batteries. Therefore, improved energy storage devices with stable electrochemical performance and improved safety are needed to enable devices requiring electrical power as well as those benefiting from efficient energy storage.

SUMMARY

This document describes methods of operating RFBs, as well as RFB devices having solid hybrid electrodes that address, at least in part, the problem of electrode instability associated with dendrite growth and/or SEI layer failure. The solid hybrid electrode can result in the shifting of the interfacial redox reaction away from the surface of the electroactive electrode. Accordingly, embodiments described herein can exhibit long and stable cycling at high current densities. RFB, as used herein, can refer to a single cell or a stack of cells, wherein each cell comprises a first half cell, a second half cell, and terminals allowing current to flow into and out of the cell. Each half cell can comprise an electrode and/or an electrolyte. A half-cell can further comprise a current collector.

The embodiments described herein comprise a first half cell separated by a separator or membrane from a second half cell containing the solid hybrid electrode. The first half cell comprises a first redox couple dissolved in a solution or contained in a suspension. The solid hybrid electrode comprises a first electrode electrically connected to a second electrode, thereby resulting in an equipotential between the first and second electrodes. The electrical connection can be a physical connection by contact and/or through a wire or connector. Some embodiments can further comprise a reservoir containing a supply of the first redox couple dissolved in the solution or contained in the suspension, the reservoir connected to the first half cell via a conduit and a flow regulator. Other embodiments, alternatively or in addition, can further comprise a fluid circulator to induce flow in an electrolyte in the second half cell.

As used herein, equipotential can encompass minor deviations from a theoretical equipotential (i.e., a pseudo-equipotential). For example, the first electrode and second electrode should, in principle, have the same potential. However, in some instances, it can take significant time to reach equilibrium and equal potential. Thus, the potentials of the first and second electrodes may be very close, but may not be quite equal. In preferred embodiments, the potential differences between the first and second electrode is negligible.

In one sense, the first and second electrodes are connected in parallel to function as an electrode. The first and second electrodes can be separated by a separator or membrane or can be exposed directly one to another. Furthermore, the first and second electrodes can be in direct contact or can be separated by some volume. In particular embodiments, the first and second electrodes remain in contact during operation and not merely prior to initial cycling. For example, the second electrode is not merely an initial source of electroactive metal to be incorporated into the first electrode (i.e., intercalated, deposited, etc.). According to one embodiment, the first electrode functions as a drain for metal ions and helps to decouple the contamination problem, or undesired reactions, on the second electrode throughout operation of the device.

The first electrode comprises a conductive solid material and the second electrode comprises a solid electroactive metal. In one embodiment, the first electrode comprises a carbon electrode. Examples of carbon electrodes include, but are not limited to, conductive carbon materials such as graphite, hard carbon, carbon black, carbon fibers, graphene, graphite felt, carbon nanotubes, and combinations thereof. The second electrode comprises a solid electroactive metal. Examples of solid electroactive metals can include, but are not limited to, Li, Na, K, Zn, Si, Mg, Ca, Al, Sn, Fe, and combinations thereof.

According to various embodiments, the redox couple can comprise a redox active organic, inorganic, or organometallic compound. Examples of redox active organic compounds can include, but are not limited to, TEMPO, anthroquinones, DBBB, sulfides, disulfides, polysulfides, nitroxyl radicals, galvinoxyl radicals, carbonyl compounds, quinones and quinone derivatives, TEMPO, metallocenes ferrocenes, carbazoles, tertiary amines, 2,5-di-tert-butyl-1,4-dialkoxybenzenes, quinoxalines, phthalocyanines, porphyrins, pyrazines, and combinations thereof. Examples of redox active inorganic compounds can include, but are not limited to, sulfur and sulfur compounds, selenium and selenium compounds, iodides and polyiodides, bromides and polybromides, chlorides and polychlorides, and combinations thereof. In one embodiment, the redox active couple in the first half cell comprises polysulfides. In one example, the polysulfides can comprise $Li_xS_y$, wherein x is from 0 to 4, and y is from 1 to 8. Examples of redox active organometallic compounds can include, but are not limited to, ferrocene compounds including structure-modified ferrocene ionic liquids. In some embodiments, the first redox couple has a concentration greater than 0.1 M in the liquid solvent. In other embodiments, the first redox couple has a concentration greater than or equal to 0.5 M.

In one embodiment, the first electrode of the solid hybrid electrode comprises a conductive carbon material and further comprises a metalated carbon during charging and discharging of the RFB. Alternatively, or in addition, the first electrode comprises metal ions intercalated therein, deposited thereon, or both. Preferably, the carbon electrode is maintained in a metalated carbon state. Traditional energy storage devices are typically metalated during a charge process but demetalated during a discharge process. However, according to the present embodiment, loss of metalated carbon from the carbon electrode is compensated by the metal electrode (the second electrode) of the hybrid anode. Accordingly, the carbon electrode can be viewed as a sink to drain metal ions from the metal electrode. Furthermore, in some instances, metal ions can return to the metal anode instead of to the carbon electrode as metalated carbon when charging.

In one embodiment a RFB has a first half cell comprising a first redox couple dissolved in a solution or contained in a suspension at a concentration greater than 0.1 M, a second half cell comprising a solid hybrid electrode, and a separator or membrane between the first and second half cells. The solid hybrid electrode comprises a first electrode electrically connected to a second electrode, thereby resulting in an equipotential between the first and second electrodes. The electrical connection can be a physical connection by contact and/or through a wire or connector. The first electrode comprises a conductive solid material and the second electrode comprises Li as an electroactive metal.

This document also describes methods of operating an RFB having a first half cell comprising a first redox couple dissolved in a solution or contained in a suspension, a second half cell comprising a solid hybrid electrode, and a separator or membrane between the first and second half cells. The methods comprise operating a first electrode and a second electrode at an equipotential, wherein the hybrid electrode comprises the first connected to the second electrode, the first electrode comprising a conductive solid material and the second electrode comprising a solid electroactive material.

The methods can further comprise metalating the first electrode with metal from the second electrode. Preferably, the second electrode is maintained in a metalated state throughout operation of the energy storage device. In another embodiment, the method can comprise extracting metal ions from the second electrode through the metalated material of the first electrode. Alternatively, or in addition, the method can comprise intercalating metal ions in the second electrode, depositing metal ions on the second electrode, or both. In yet another embodiment, the method can further comprise controllably flowing the first redox couple dissolved in the solution or contained in the suspension from a reservoir to the first half cell via a conduit and a flow regulator, the reservoir containing a supply of the first redox couple dissolved in the solution or contained in the suspension. In a further embodiment, the method can comprise circulating an electrolyte in the second half cell.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

It will be clear from this description that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1A:
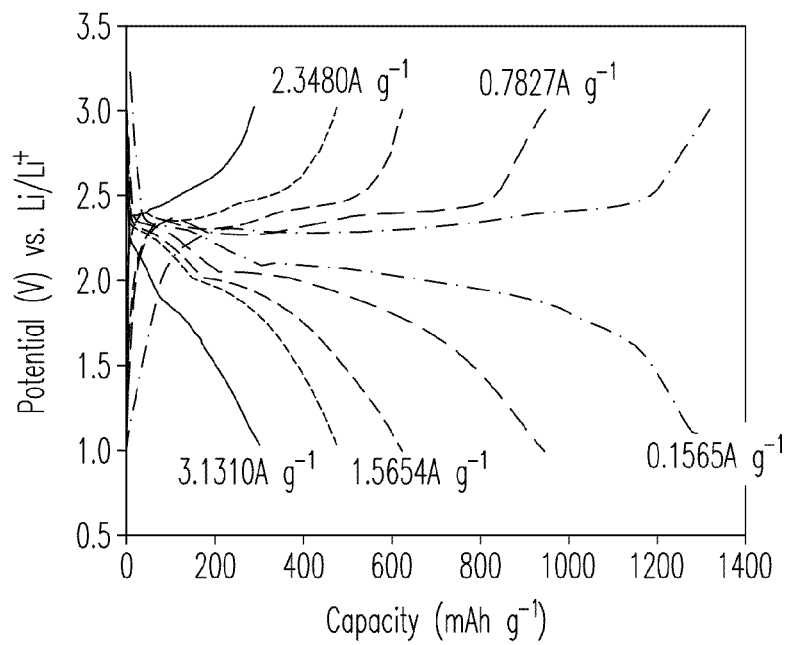
FIGS. 1A-1D are discharge-charge profiles, cycle stability and Coulombic efficiency plots for traditional Li—S cells at various current rates.
Figure 1B:
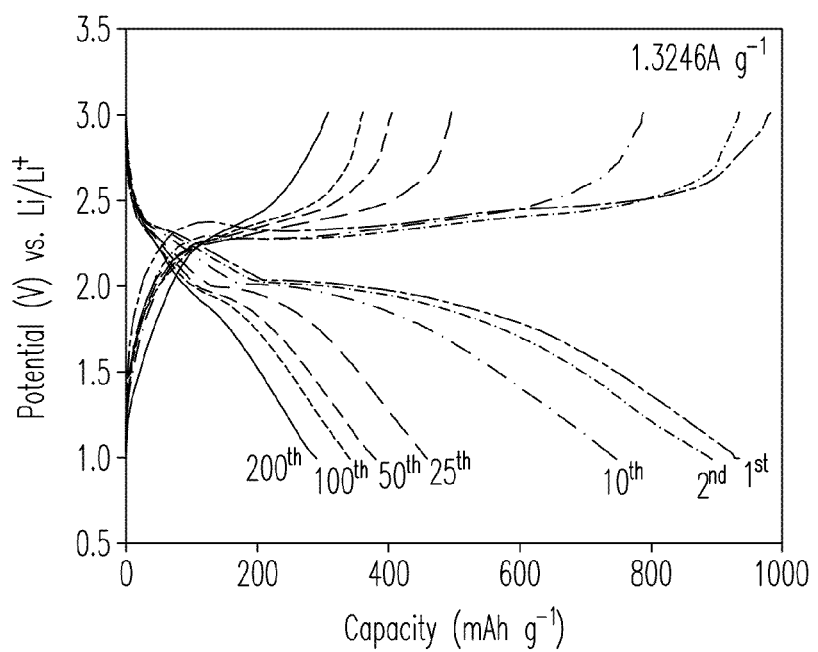
Figure 1C:
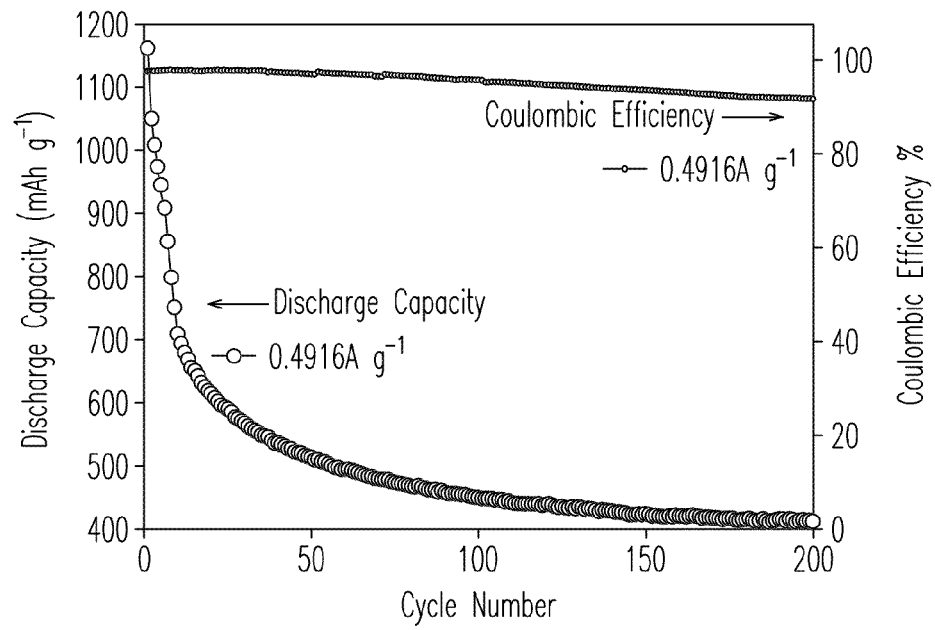
Figure 1D:
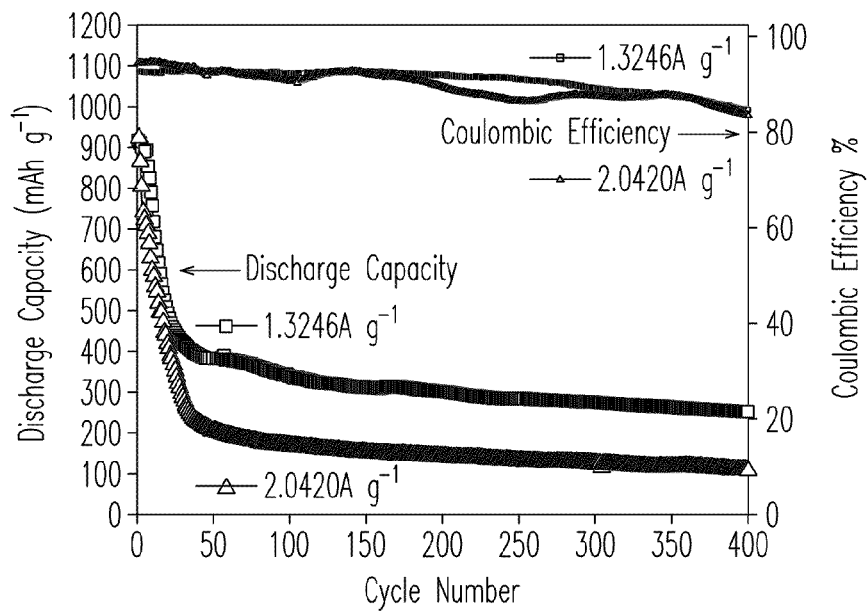

In certain traditional RFBs, dendrite formation on a metal anode has been identified as one reason for poor cycling stability, especially when operating at high current densities. The continuous loss of active material can be another reason for poor cycling stability. In one example, electrochemical characteristics of traditional, non-flowing Li—S cells containing sulfur-impregnated mesoporous carbon cathodes are plotted in FIGS. 1A-1D. Morphologies of the Li metal after cycling of these traditional cells are provided in FIG. 2. Typical voltage profiles of sulfur are observed in FIG. 1A (i.e. 2.3 V for transition from S to $Li_2S_4$ and 2.0 V for the further reduction to $Li_2S_2/Li_2S$). When the current density was increased from 0.156 A g$^{-1}$ to 3.131 A g$^{-1}$, the discharge capacity decreased from 1200 mAh g$^{-1}$ to 300 mAh g$^{-1}$ (see FIG. 1B). This cycling performance is expected from traditional mesoporous carbons, which show after about 20 cycles, that capacity retention decreases by approximately 50% and decays very rapidly thereafter when cycled at a low current rate (FIG. 1C). Capacity fade becomes even worse when the cell is cycled at higher current rates (FIGS. 1 B and D). Correspondingly, the Columbic efficiency continues to decline during cycling.

Figure 2A:
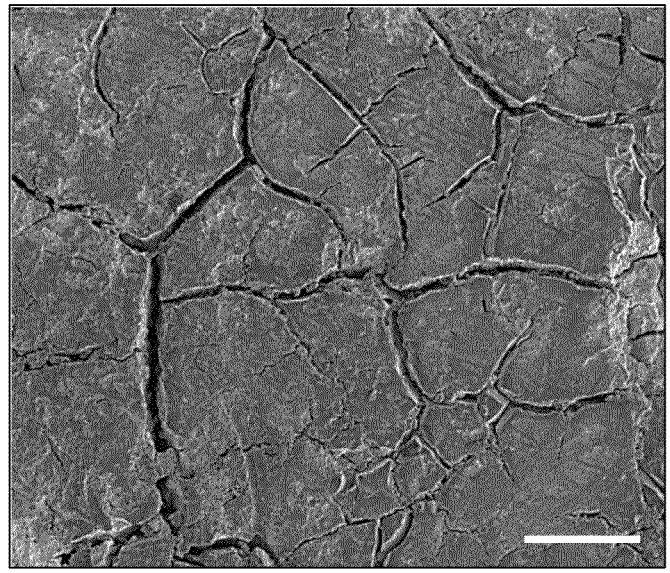
FIGS. 2A-2C include SEM micrographs of lithium foil anodes after cycling in traditional Li—S cells.
Figure 2B:
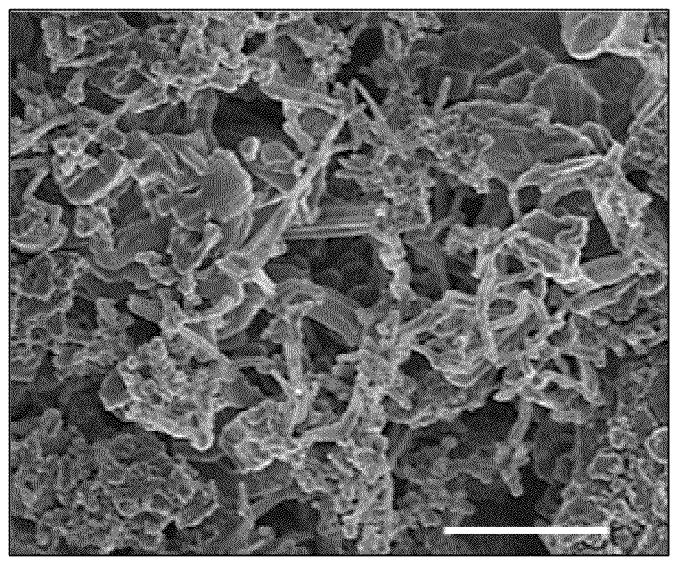
Figure 2C:
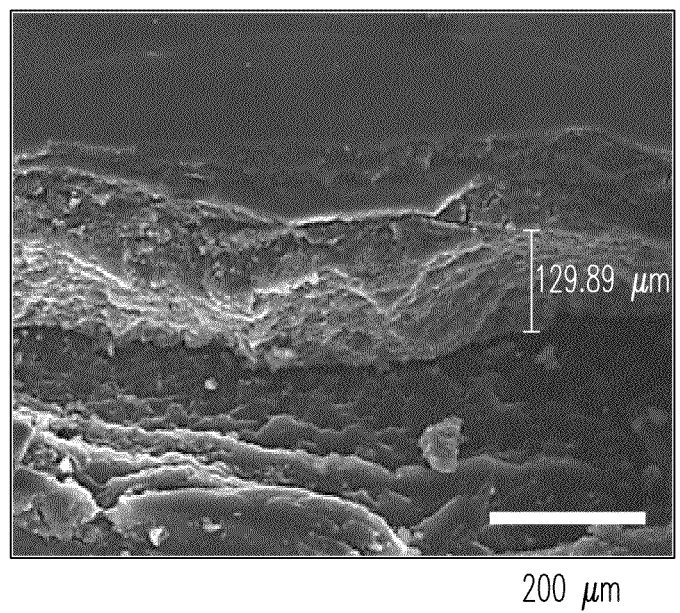

The Li anode, after extensive cycling in this traditional cell, was investigated using SEM as shown in FIG. 2. FIG. 2A shows the top view of the Li anode after cycling. The surface is covered with a thick passivation layer and is characterized by large cracks caused by electrolyte depletion. At higher magnification, the micrograph in FIG. 2B reveals that the Li foil became highly porous, consisting of tubular and irregular particles. The cross-sectional SEM micrograph in FIG. 2C shows that the passivation layer is more than 100 μm thick. More importantly, at higher magnification, cross-sectional SEM and sulfur elemental mapping indicate an extensive (>100 μm thick) reaction zone where the Li metal is penetrated by sulfur. Energy dispersive spectroscopy (EDS) and X-ray fluorescence spectroscopy (XPS) suggest that the chemical composition in this surface film is a complicated combination of sulfides, sulfates, fluorides, and carbonates. However, one can conclude that, in addition to the traditional solid electrolyte interface (SEI) film that is usually formed on Li anode surfaces, a large contributor to this passivation layer is from reactions between Li and dissolved polysulfides, which ultimately form a series of complicated sulfur-containing compounds. The continuous formation of porous Li metal during cycling consumes active sulfur in the electrolyte and increases cell impedance. While mesoporous carbon in the cathode can delay the release of soluble polysulfides, the confinement effect from cathode structures are only effective for a limited time. Further cycling leads to sulfur dissolution of the cathode and more importantly, Li+ metal deposition on the porous Li anode, which then increases the resistance of the entire cell. This results in rapid capacity decay (usually observed after 50 cycles) when only cathode modulation is adopted in this system.

Embodiments of the present invention can address, at least in part, these problems. In contrast to the Li—S traditional cell described above, and other similar systems, the use of the hybrid electrode, according to embodiments described herein, can result in the interfacial redox reaction being shifted away from the surface of the electroactive metal. The connection in parallel of the first and second electrodes of the hybrid electrode, in one sense, forms a shorted cell where the first electrode is maintained in a metalated form at equilibrium state and also maintains a pseudo-equal potential with the second electrode. As such it functions as a dynamic "pump" that supplies electroactive metal ions as necessary. The first electrode also functions as an effective SEI layer of electroactive metal. The hybrid electrode can be employed in RFBs or in non-flowing cells.

According to one embodiment, a lithium-sulfur RFB employs a first half cell comprising sulfur and/or sulfur compounds flowing through the half cell as a redox couple. The second half cell employs a hybrid anode comprising a graphite electrode and a lithium metal electrode connected with each other. The RFB is configured such that the graphite is in the lithiated state during operation and functions as a dynamic "pump" that supplies Li$^+$ ions while minimizing direct contact between soluble polysulfides and Li metal. Therefore, the continuous corrosion and contamination of Li anode during repeated cycling can be largely mitigated.

Figure 3A:
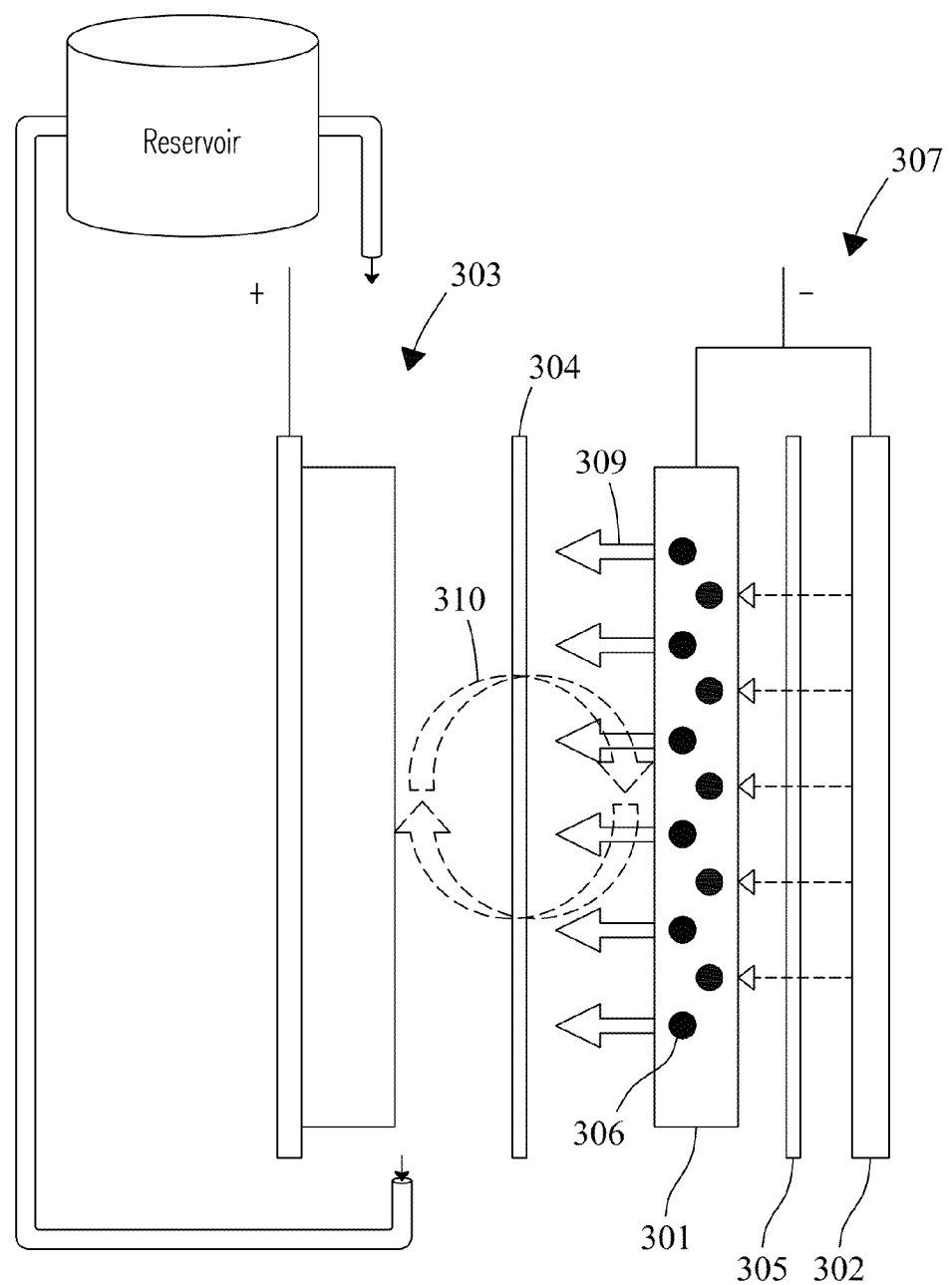
FIGS. 3A and 3B depict different configurations of hybrid anodes in energy storage devices according to embodiments of the present invention.

Referring to the embodiment in FIG. 3A, a conductive solid electrode 301 (i.e., first electrode) is directly connected with an electroactive metal electrode 302 (i.e., second electrode) in an electrically parallel configuration and used together as a hybrid anode 307. In some embodiments, to enhance electrical contact, a conductive material can be utilized to contact a significant portion or surface of the first electrode. For example, a metal wire cloth can contacting a face of the first electrode can help connect the first and second electrodes. A hybrid anode separator 305 can be placed between the conductive solid and metal electrodes. In some embodiments, the separator can be a porous polymeric separator, a porous ceramic separator, or a membrane. One example includes, but is not limited to a microporous membrane based on polypropylene, polyethylene, or both (e.g., Celgard®). Alternatively, the hybrid anode separator can be absent (see FIG. 3B). The first electrode comprises metal ions 306 transferred from the second electrode and intercalated and/or adsorbed at the first electrode. In some instances, a region around the first electrode can develop wherein byproducts can accumulate, deposit and/or contaminate. During discharge, metal ions will move 309 toward the first half cell 303 through a separator 304. The separator can be a ceramic or polymer porous separator or membrane. One example includes, but is not limited to, polyethylene-based or polytetrafluoroethylene-based porous separators or perfluorosulfonic acid membranes such as Nafion®. The first half cell can further comprise a reservoir containing a supply of the first redox couple dissolved in a solvent or contained in a suspension. The reservoir can be fluidly connected to the first half cell via conduits and flow regulators that provide the flowable material from the reservoir in a batch or continuous fashion.

Figure 3B:
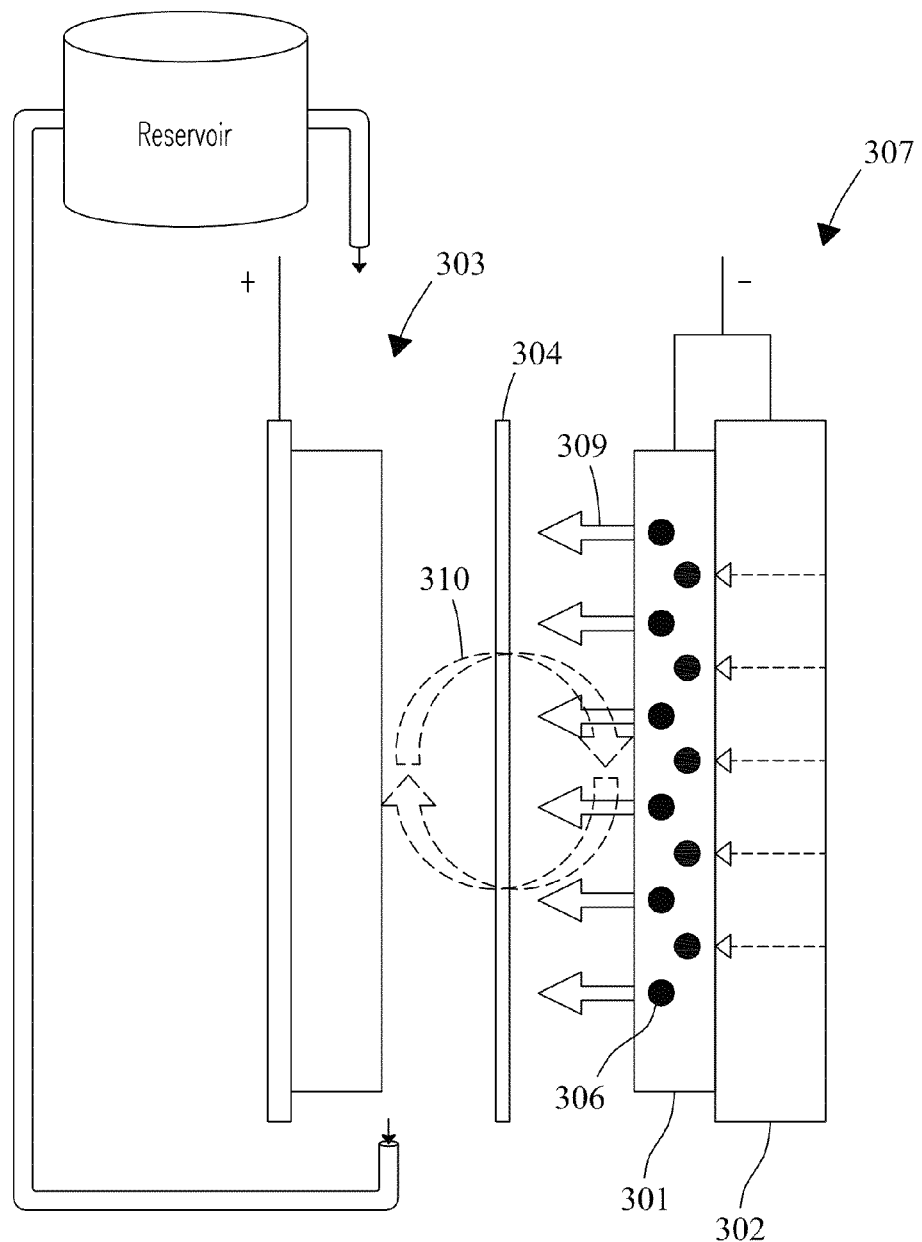

Circular arrows 310 depict the shuttling of dissolved ionic species between the anode and cathode. As shown in FIG. 3B, the first electrode 301 and the second electrode 302 can be in direct contact (with or without an anode separator). Once immersed in electrolyte, the conductive solid material of the first electrode will be immediately discharged and will be maintained in the metalated state because the hybrid anode is in one sense a shorted metal/conductive material cell.

Figure 4A:
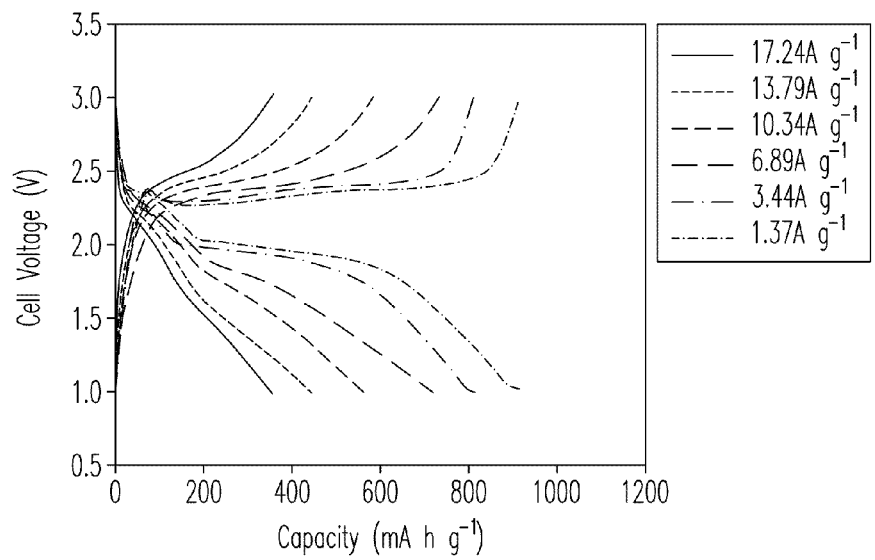
FIGS. 4A-4D are discharge-charge profiles, cycle stability and Coulombic efficiency plots at various current rates for Li—S battery having hybrid anodes according to embodiments of the present invention.
Figure 4B:
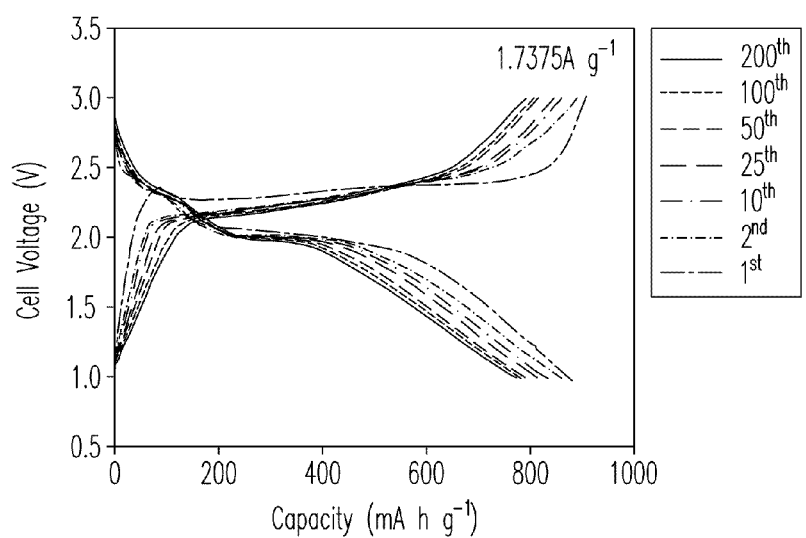
Figure 4C:
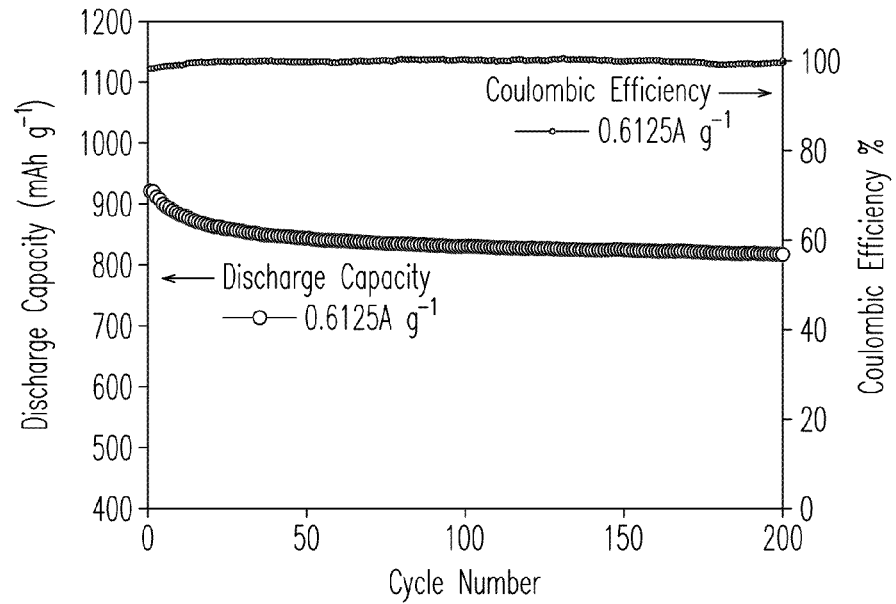
Figure 4D:
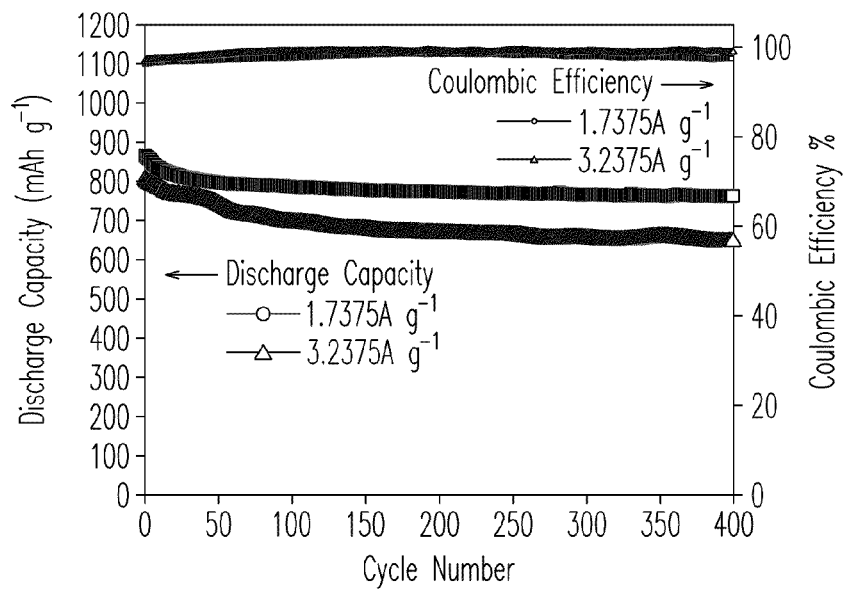

FIG. 4A shows the voltage profiles at different current densities of a non-flowing Li—S cell utilizing a hybrid anode as described herein. The data demonstrates the performance of the hybrid anode. Briefly, the cell, which is not a RFB configuration, includes a cathode comprising sulfur and/or sulfur compounds and a hybrid anode. The hybrid anode comprises a graphite electrode and a lithium metal electrode. The cell delivered a reversible capacity of greater than 900 mAh g$^{-1}$ at 1.37 A g$^{-1}$ (~0.8 C). Even at a high rate of 13.79 A g$^{-1}$ (~8 C), more than 450 mA g$^{-1}$ capacity was demonstrated. In addition, far more stable discharge/charge profiles of sulfur are observed in these cells (see FIG. 4B). FIGS. 4C and 4D compare the long term cycling performance at different current densities along with Coulombic efficiencies of Li—S cells that contain hybrid anodes according to embodiments of the present invention. A significantly improved cycling stability was observed at all rates. For example, at 0.6125 A g$^{-1}$, although initial capacity loss is still observed, the capacity becomes extremely stable after 50 cycles, maintaining approximately 850 mAh g$^{-1}$ for more than 200 cycles (FIG. 4C). The Columbic efficiency is also nearly 100% over the entire cycling test due to the absence of overcharging in the cells. Similar performance is further observed at higher discharge rates (see FIG. 4D), which indicates that the shuttle mechanism has been significantly reduced or eliminated.

In some embodiments, the first electrode is metalated. For example, in the non-flowing Li—S battery having a hybrid anode as described above, the graphite electrode can comprise lithiated carbon. Similar metalation of the first electrode can occur in flowing configurations of RFBs described elsewhere herein. The lithiated carbon can be a physical barrier that interferes with the traditional concentration gradient of soluble species in the electrolyte. Physical absorption of polysulfides on the graphite surface reduces further transport of soluble intermediates onto the lithium metal anode. Control cells in which Li foil and graphite electrodes were not connected in parallel, yet were in physical contact, confirm that embodiments of the present invention can minimize the reaction of polysulfides with the Li metal anode. When compared with traditional, non-flowing Li—S cells (as shown in FIG. 1C), cycling performance is only slightly improved indicating that the graphite forms a partial physical/chemical barrier, even when not connected to the lithium metal anode, that can slow down adverse polysulfide reactions with Li metal, although not to the extent seen in the hybrid anodes described herein.

In some RFB embodiments, a metalated first electrode can function as a pump to supply electroactive metal ions during discharge. The metalated first electrode in a RFB having hybrid anodes described herein can supply metal ions during discharge. In one example, the hybrid electrode has a first electrode comprising graphite and a second electrode comprising Li. The graphite electrode can be lithiated by the lithium electrode. There is a difference of 0.02 V between the Li$^+$ extraction voltage for LiC$_6$ from the lithiated graphite electrode and Li metal. Thus, theoretically Li$^+$ should first move from Li metal to the graphite during discharge in a Li—S RFB cell. However, at relatively higher rates than those used in conventional lithium batteries, Li$^+$ ions will be released from both LiC$_6$ in the graphite electrode and from Li metal because the surface concentration of Li$^+$ ions around either LiC$_6$ or Li surfaces are both very low (close to zero) at high current densities. Under this condition, the 0.02 V voltage difference may be negligible and Li$^+$ ions may be largely provided by the lithiated graphite considering their position in the cell configuration. Because the first electrode is shorted with the second electrode, once Li$^+$ is depleted from the graphite, it can be quickly replenished from the Li metal. In other words, lithiated graphite can function as a dynamic "pump" that continuously drains Li$^+$ ions from Li metal reservoir and ejects Li$^+$ ions on demand.

Figure 5:
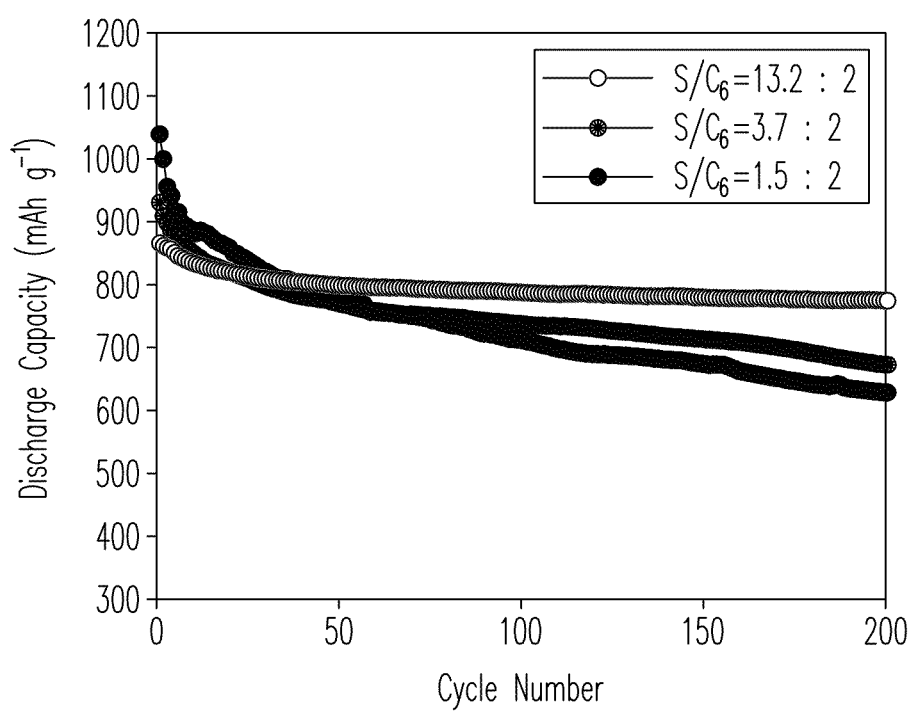
FIG. 5 is a plot of discharge capacity as a function of cycle number for a Li—S battery having a hybrid anode according to embodiments of the present invention with varying amounts of carbon in the structure.

Referring to FIG. 5, the electrochemical behavior of a series of non-flowing Li—S cells utilizing hybrid anodes with different graphite loadings were fabricated and compared at a 1 C rate. Assuming the stoichiometric reaction S+2Li=Li$_2$S, the molar ratio of S/graphite (C$_6$) should be 1/2 because in graphite, 1 mole of Li$^+$ ions has to be accommodated by 6 moles of carbon atoms (LiC$_6$). When S is provided in excess, then the discharge capacity can be determined by LiC$_6$ on the anode side because Li$^+$ ions are mainly provided from LiC$_6$ as described previously. Three different S:C$_6$ ratios (all greater than 1/2) were compared and FIG. 5 shows that the initial discharge capacity is proportional to the moles of graphite, while the total Li$^+$ ions available from Li metal was identical in all cases. These findings provide further evidence that, during discharge, Li$^+$ ions are provided from lithiated graphite, while Li metal can be considered a Li$^+$ reservoir that refills graphite as Li$^+$ ions are depleted. The major electrochemical reaction occurs between the cathode, which comprises sulfur and/or sulfur compounds, and the carbon electrode, which comprises LiC$_6$, in the hybrid anode. In comparison, a simple non-flowing LiC$_6$/S cell using the same sulfur/sulfur compound-containing cathode combined with a prelithated graphite anode shows poor electrochemical performance.

Although higher amounts of graphite can result in a larger initial capacity using the hybrid anodes described herein flow RFBs or non-flowing cells, capacity fading is also more pronounced with increasing LiC$_6$ content. This can be attributed to the increased thickness and available surface area of graphite incorporated in the hybrid anode. Because an equivalent amount of electrolyte would be used in all tests and the graphite faces the separator, the accessibility of electrolyte, and subsequent dissolved polysulfide species, to the Li metal electrode is reduced. Therefore sulfur, and polysulfide, reactions are primarily confined to the graphite preferentially over the Li metal surfaces. For this reason, the total surface area of graphite dictates the amount of "wasted" sulfur, i.e. sulfur consumed in surface reactions and SEI formation, on the anode. This can explain why the cycling behavior of cells with higher carbon-to-sulfur ratios is inferior to those with lower amounts of graphite (FIG. 5). To further confirm that a lower surface area of carbon can benefit the hybrid design, a hard carbon (BET surface area: 75.8 m$^2$ g$^{-1}$) was used to replace graphite (BET surface area: 6.4 m$^2$ g$^{-1}$) in the hybrid structure. As expected, the performance from non-flowing cells using the hard carbon/Li anode is worse than those using the original graphite (LiC$_6$)/Li hybrid design. Nevertheless, when compared to traditional non-flowing Li—S batteries that use Li-metal anodes (FIG. 1), there is still a large improvement in performance with the cells containing a hard carbon/Li hybrid anode, further validating the unique benefits of the hybrid electrodes described herein for RFBs and non-flowing cells. In preferred embodiments, the carbon materials have an electrochemical reduction potential very close to Li/Li$^+$ (to facilitate Li$^+$ extraction) combined with a low surface area to reduce undesired side reactions with sulfur species. Depending on the specific application and challenges, it is possible for one to design the hybrid electrode in a way that the potential of the first electrode (eg. graphite) is slightly higher or lower than that of the second electrode (metal electrode), so that the first electrode will act as a buffer between the second electrode (metal electrode) and the active species from the positive electrode or electrolyte to avoid the unwanted side reactions.

Figure 6A:
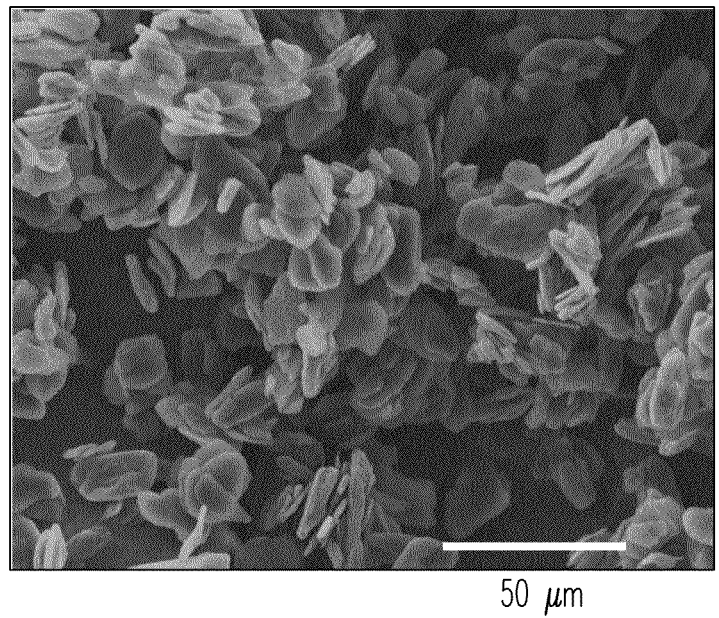
FIGS. 6A-6D include SEM micrographs of hybrid anodes before and after operation of Li—S batteries according to embodiments of the present invention.
Figure 6B:
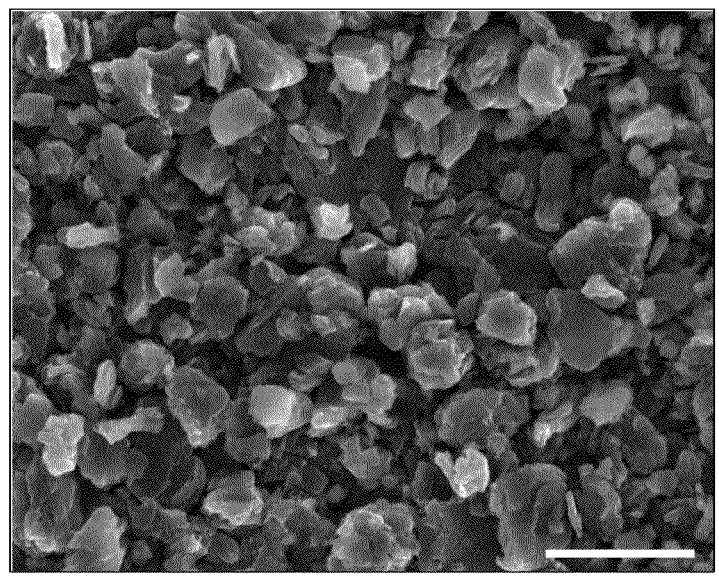
Figure 6C:
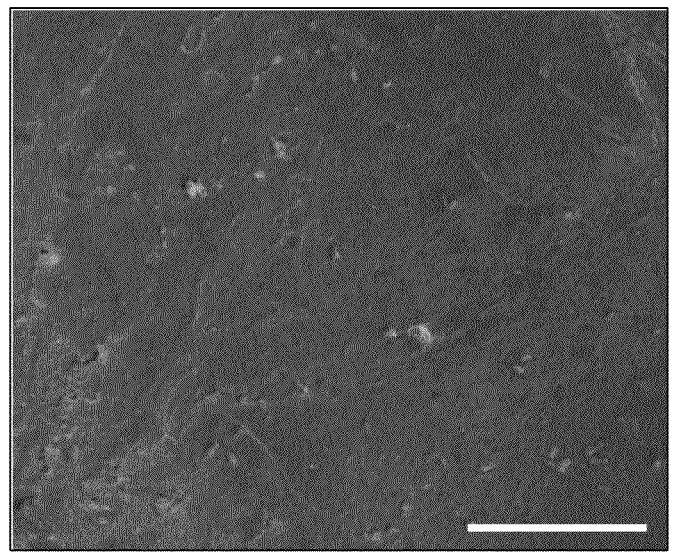
Figure 6D:
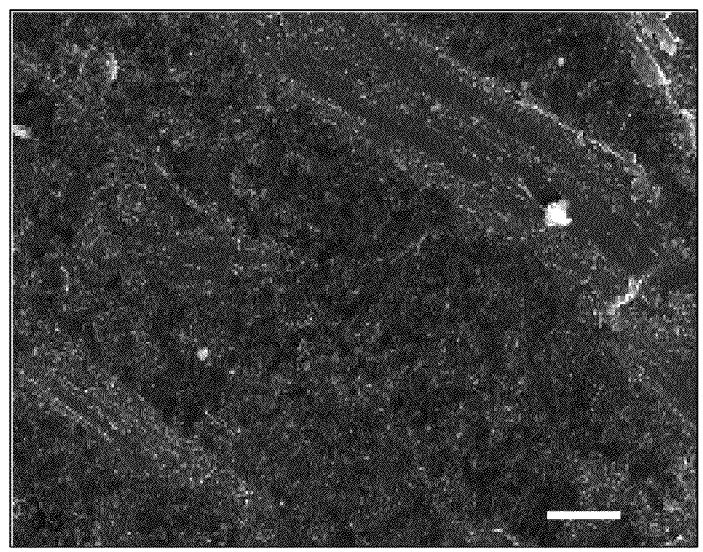

In some embodiments, during charging, metal ions can diffuse back to the second electrode where they are redeposited. One issue is to determine if the metal ions will preferentially deposit on the second electrode or the metalated portions on the first electrode of the hybrid electrode. SEM micrographs of the Li-graphite hybrid electrode described above are shown in FIG. 6. The micrographs exhibit the "as prepared" graphite surface of the hybrid anode (FIG. 6A) and the same surface after 1000 charge/discharge cycles at a 1 C rate (FIG. 6B) in a non-flowing Li—S cell. Little morphological change has occurred after extensive cycling yet the surface is rich in sulfur as determined by elemental mapping. After long-term cycling of the non-flowing Li—S cell with hybrid anode, the morphology of the corresponding Li-foil surface (facing the graphite) is shown in FIGS. 6C and D. There is no evidence of dendritic lithium growth or extensive surface reactions which is dramatically different than the Li metal anodes tested in conventional Li—S cells (FIGS. 2A and 2B). In addition, minimal amounts of sulfur were observed on the Li metal surface using EDS mapping. These findings suggest that the highly reactive electrolyte/solid domains that cause active mass loss are largely transferred from the Li metal to lithiated graphite. Graphite is an intercalation compound that can accommodate up to 10% volume expansion without mechanical degradation and exposure of new reactive surfaces thus reducing parasitic losses in the cell.

According to another embodiment, a high-performance non-aqueous RFB has a first half cell comprising a redox active organic compound dissolved in an organic liquid supporting solution, a second half cell comprising a hybrid anode having first and second electrodes connected in parallel, and a separator between the first and second half cells. In one example, the redox active organic compound comprises a ferrocene (Fc)-based catholyte as a redox couple in an organic liquid supporting electrolyte and the separator comprises a polyethylene-based microporous separator. The hybrid anode has a first electrode comprising graphite felt and a second electrode comprising Li metal.

With a Li metal anode, rather than a hybrid anode, the stability of the RFB is significantly decreased, especially at high concentrations of the first redox couple. In one example, a RFB similar to the Li-organic non-aqueous RFB (LORFB) described above that does not utilize the hybrid anode is limited in its performance and cyclability. One LORFB without a hybrid anode achieved a high cell voltage of 3.49 V. The molecular structure of the ferrocene is modified with an IL functional group to increase its solubility. Absent the hybrid anode, to protect the deteriorating dendrite growth on the Li anode surface and to stabilize the solid electrolyte interface (SEI), a fluoroethylene carbonate (FEC) additive was used in the electrolyte.

Figure 7:
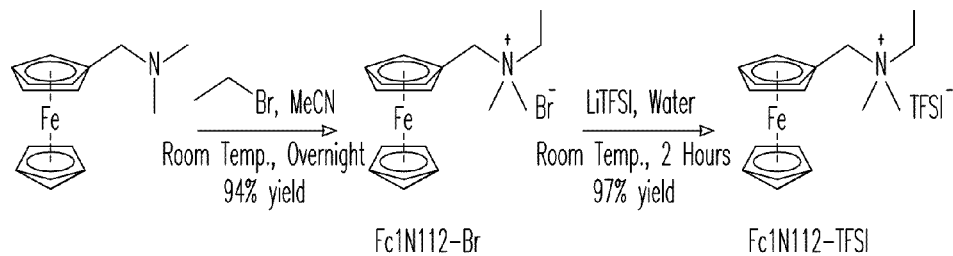
FIG. 7 depicts a scheme for reacting a ferrocene to yield a ferrocene ionic liquid according to embodiments of the present invention.

The catholyte of the first half cell in the instant embodiment contained lithium bis(trifluoromethanesulfonyl)imide (LiTFSI) as the supporting electrolyte in a carbonate solvent mixture of ethylene carbonate (EC)/propylene carbonate (PC)/ethyl methyl carbonate (EMC) at a weight ratio of 4:1:5. As mentioned before, the ferrocene structure was chemically modified to include a polar IL pendant of tetraalkylammonium-TFSI (see FIG. 7), thereafter referred as Fc1N112-TFSI, to increase its solubility in the polar solvent system.

The ferrocene-based IL compound (Fc1N112-TFSI) was prepared via a nucleophilic substitution of a commercially available ferrocene derivative, (dimethylaminomethyl)ferrocene (Fc1N11), with bromoethane in acetonitrile, to produce the dimethyl ethyl ferrocenylmethyl ammonium bromide (Fc1N112-Br), followed by exchange of the Br with TFSI in deionized water to afford the final product Fc1N112-TFSI at an overall yield of 91%. By virtue of the structural modification, the resulted Fc1N112-TFSI shows a dramatically enhanced solubility of 1.7 M in the EC/PC/EMC solvent system, and of 0.85 M in the electrolyte of 1.2 M LiTFSI in EC/PC/EMC.

Figure 8A:
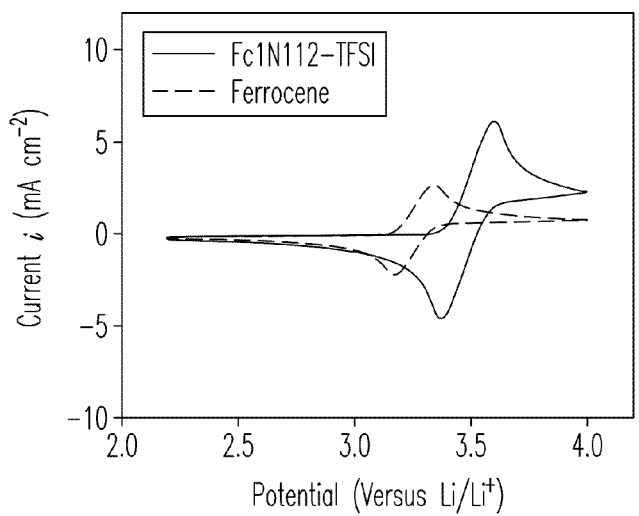
FIGS. 8A-8C include (a) CV scans of ferrocene and Fc1N112-TFSI in a 1.0 M LiTFSI electrolyte; (b) CV scans of Fc1N112-TFSI in a 1.0 M LiTFSI electrolyte at different scan rates according to embodiments of the present invention.

Cyclic voltammogram (CV) tests of ferrocene (0.04 M) and Fc1N112-TFSI (0.1 M) were carried out in the electrolyte of 1.0 M LiTFSI in EC/PC/EMC at a scan rate of 50 mV s$^{-1}$ over the potential range of 2.5-4.0 V versus Li/Li$^+$ (FIG. 8A) reveal some of the electrochemical properties of the redox couples. Single-electron-transfer redox reactions are identified for both compounds corresponding to the ferrocene/ferrocenium (Fc/Fc$^+$) redox couple, which indicates the chemical modification causes no changes to the redox center. The Fc1N112-TFSI exhibits well-defined oxidation and reduction potentials of 3.60 V and 3.38 V versus Li/Li$^+$, respectively, yielding a higher half-wave potential (3.49 V) than that of the non-functionalized ferrocene at 3.26 V. Because of the electron-withdrawing effect of the positively charged ammonium pendant (i.e., 1N$^+$112), the Fc1N112-TFSI shows a 0.23 V positive shift in the redox potential compared to the ferrocene, which benefits the Li|Fc1N112-TFSI flow battery system with an expanded cell voltage that is more than two times higher than those of aqueous RFB systems.

Figure 8B:
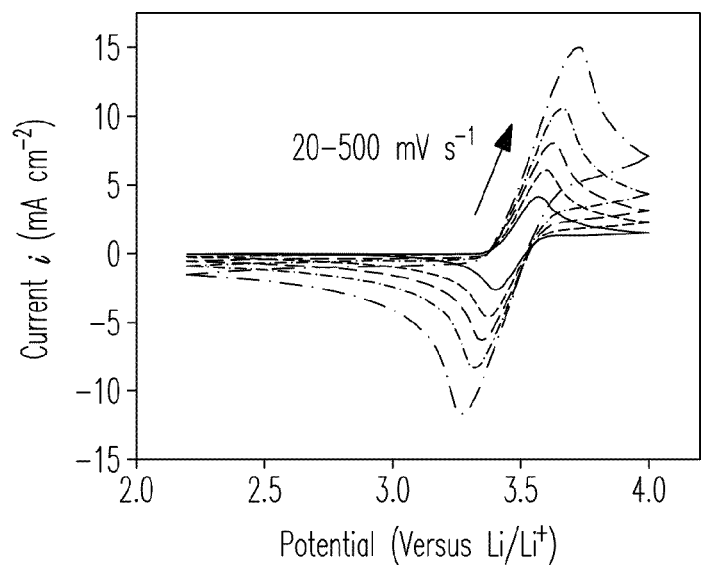
Figure 8C:
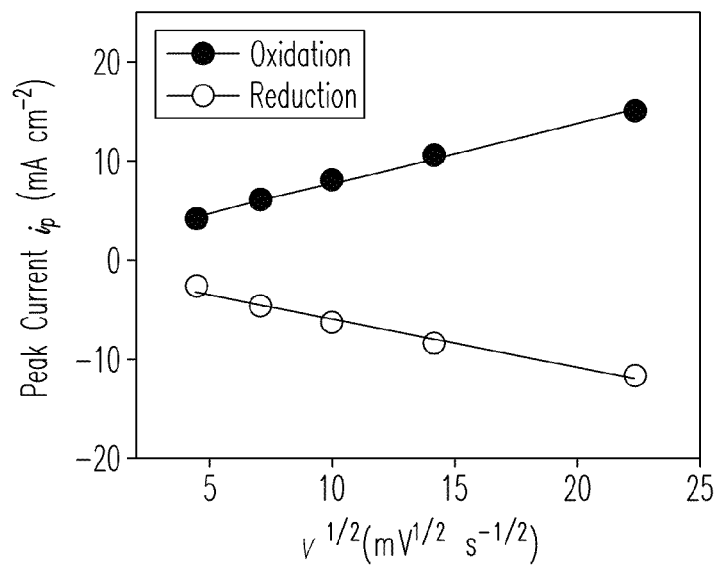

At a Fc1N112-TFSI concentration of 0.85 M the Li|Fc1N112-TFSI flow cell is able to store a theoretical volumetric energy density of 79.5 Wh L$^{-1}$. FIG. 8B shows the CV curves of the Fc1N112-TFSI in the same electrolyte at scan rates varying from 20 to 500 mV s$^{-1}$. The derived linear relationship of the oxidation and reduction peak currents ($i_p$) with respect to the square root of the voltage sweeping rate (v) shown in FIG. 8C reveals that the Fc/Fc$^+$ redox reaction is a typical diffusion-controlled reaction.

Figure 9A:
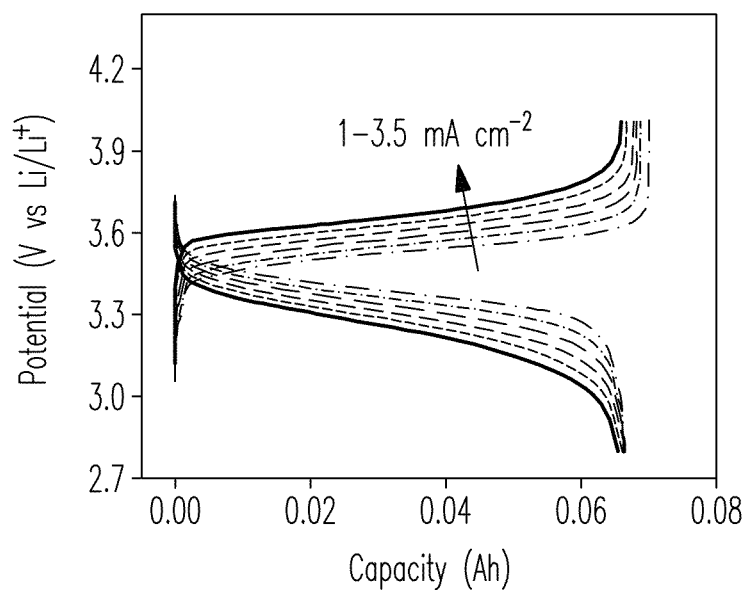
FIGS. 9A-9C include plots depicting electrochemical performance of the Li|Fc1N112-TFSI flow cell using 0.1M Fc1N112-TFSI in 1.0 M LiTFSI with 5 wt % FEC: (a) voltage profiles with respect to cell capacity at current densities ranging from 1-3.5 mA cm$^{-2}$; (b) flow cell efficiencies and (c) flow cell charge and discharge capacities with respect to cycle number at 3.5 mA cm$^{-2}$.
Figure 9B:
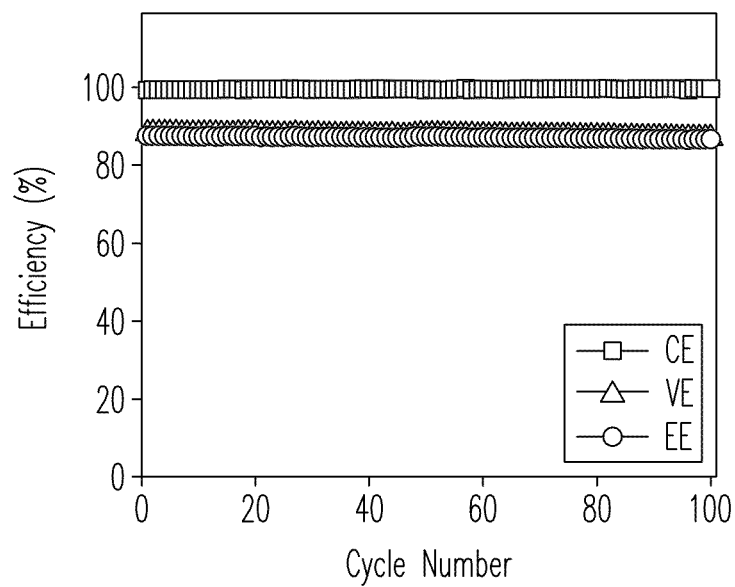

A Li|Fc1N112-TFSI LORFB, which did not employ a hybrid electrode, was demonstrated in a laboratory flow cell with a catholyte concentration of 0.1 M Fc1N112-TFSI in 1.0 M LiTFSI in EC/PC/EMC with 5 wt % FEC as an SEI-stabilizing additive. The voltage profiles of the Li|Fc1N112-TFSI flow cell in FIG. 9A show small discrepancies between the charge and discharge capacities, which indicates that the flow cell features low self-discharge. A fuel utilization ratio of 82% was achieved in a single cell even at a current density as high as 3.5 mA cm$^{-2}$. A long-term charge/discharge cycling of the Li|Fc1N112-TFSI flow cell at 3.5 mA cm$^{-2}$ demonstrates highly stable cell efficiencies over 100 cycles with coulombic efficiency (CE) of 99%, voltage efficiency (VE) of 88% and energy efficiency (EE) of 87% (FIG. 9B).

Figure 9C:
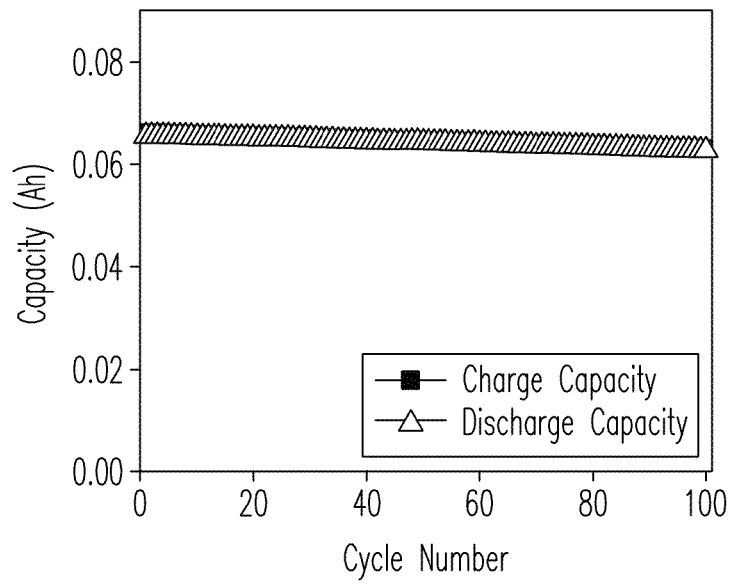

FIG. 9C shows the specific capacities and discharge energy density of the 0.1M Li|Fc1N112-TFSI flow cell with respect to cycle number at 3.5 mA cm$^{-2}$. The flow cell exhibited an excellent capability to maintain stable capacity over extended cycling with capacity retention of 95% throughout the 100 cycles. The stable capacity originated primarily from the highly stabilized SEI on the Li anode surface, which suppressed the direct contact between the Li metal and the oxidized ferrocene species (Fc$^+$) and the corresponding self-discharge reactions.

A Li|Fc1N112-TFSI flow cell with 0.8 M Fc1N112-TFSI in 1.2 M LiTFSI, containing even 15 wt % FEC, could not provide sufficient stabilization to the SEI layer on the Li surface at such a high catholyte concentration due to the significantly increased amount of Li deposition/stripping. However, the same flow cell employing a hybrid anode according to embodiments of the present invention exhibited stable cycling. The hybrid anode comprised a graphite felt electrode connected in parallel with a Li foil, wherein the graphite felt and the Li were separated by a Celgard porous separator. In some embodiments, a separator can provide improved protection to the SEI layer. The graphite felt electrode can function as the intercalation anode material to minimize lithium metal deposition. Meanwhile, the graphite felt is electrically connected to the Li foil via a stainless steel mesh to harvest the same redox potential of the Li/Li$^+$ redox couple.

Figure 10A:
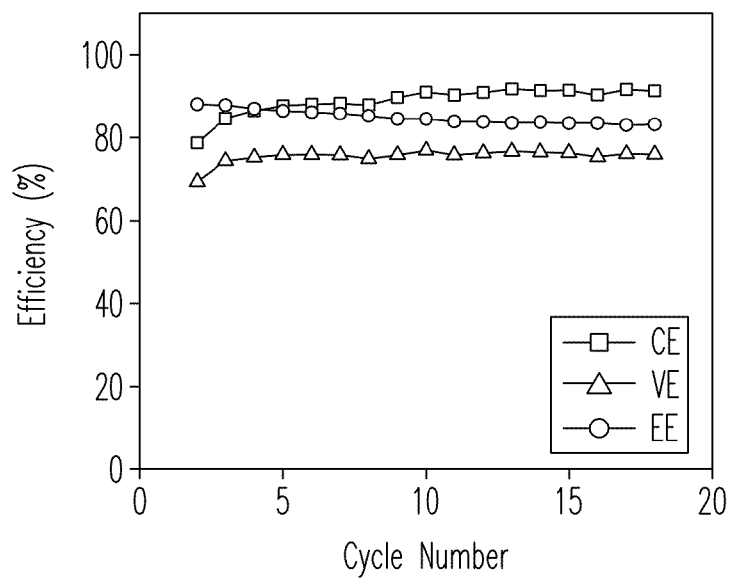
FIGS. 10A-10B include plots depicting the cycling performance of the Li|Fc1N112-TFSI flow cell having a hybrid anode and using 0.8M Fc1N112-TFSI in 1.2 M LiTFSI with 15 wt % FEC at 1.5 mA cm$^{-2}$: (a) cell efficiencies; (b) volumetric specific capacities and discharge energy density.
Figure 10B:
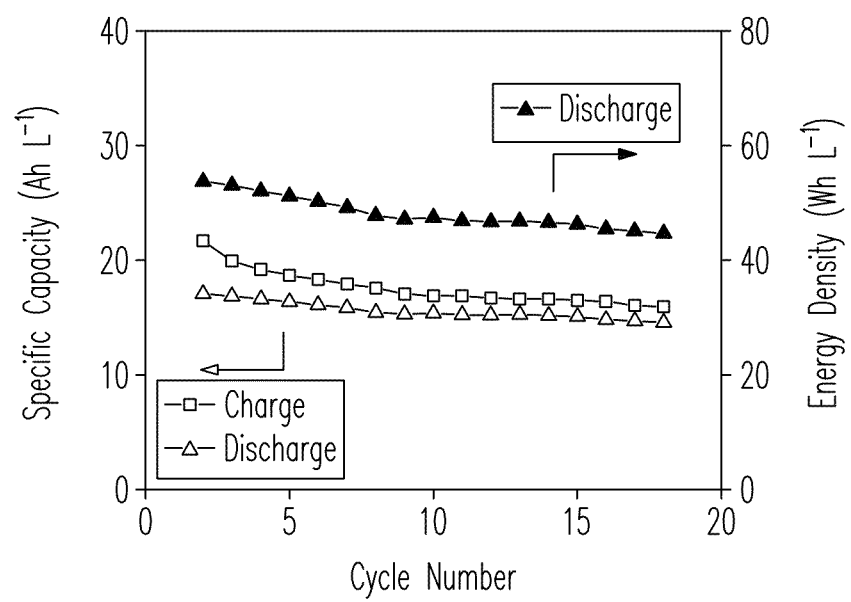

FIGS. 10A and 10B show the cycling efficiencies, and the volumetric specific capacities and discharge energy density of the 0.8 M Li|Fc1N112-TFSI flow cell over 18 cycles at 1.5 mA cm$^{-2}$. A relatively stable EE of 76% was achieved despite a gradual increase in the CE (85% to 91%) and drop in the VE (87% to 83%). The flow cell exhibited moderate capacity retention. A volumetric discharge energy density of ~53 Wh L$^{-1}$ was delivered in the initial cycles, which is about twice of that of practical VRB systems (~25 Wh L$^{-1}$). Compared to the 0.1M Fc1N112-TFSI situation, the CE at the 0.8 M catholyte concentration is lower due to longer charge/discharge durations yielding more self-discharge, and the VE is also lower due to decreased conductivity of the catholyte solution.

Without any additive, a 0.1M Li|Fc1N112-TFSI flow cell could only operate at current densities below approximately 0.25 mA cm$^{-2}$. Under similar flow cell test conditions, vinyl carbonate (VC) and/or FEC at 2 wt % content can stabilize the SEI up to 2.5 mA cm$^{-2}$ and 5.5 mA cm$^{-2}$, respectively. However, at higher catholyte concentrations, the additives were not able to meet the increased demand for SEI stabilization due to extended lithium deposition. Flow cell tests were not successful even at 0.2M Fc1N112-TFSI concentration under the same testing condition using merely a Li anode. Embodiments of the present invention, which have a hybrid anode comprising first and second electrodes (e.g., graphite felt and Li metal, respectively) connected in parallel can result in retardation of dendrite formation and proliferation without sacrificing any of the cell potential.

The anode side can be engineered to have static Fc1N112 electrolyte or flowing Fc1N112 electrolyte.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A redox flow battery (RFB) having a first half cell comprising a first redox couple dissolved in a solution or contained in a suspension, a second half cell comprising a solid hybrid electrode, and a separator or membrane between the first and second half cells, the solid hybrid electrode comprising a first electrode connected to a second electrode, thereby resulting in an equipotential between the first and second electrodes, wherein the first electrode comprises a carbon electrode as a conductive solid material and the second electrode comprises a lithium as a solid electroactive metal.

2. The RFB of claim 1, wherein the carbon electrode comprises a carbonaceous material selected from the group consisting of graphite, hard carbon, carbon black, carbon fibers, carbon nanotubes, graphite felt, graphene, and combinations thereof.

3. The RFB of claim 1, wherein the second electrode further comprises an electroactive metal selected from the group consisting of Na, K, Zn, Si, Mg, Ca, Al, Sn, Fe, and combinations thereof.

4. The RFB of claim 1, wherein the first redox couple comprises a redox active organic compound.

5. The RFB of claim 4, wherein the redox active organic compound is selected from the group consisting of TEMPO, anthroquinones, DBBB, sulfides, disulfides, polysulfides, nitroxyl radicals, galvinoxyl radicals, carbonyl compounds, quinones and quinone derivatives, TEMPO, metallocenes ferrocenes, carbazoles, tertiary amines, 2,5-di-tert-butyl-1,4-dialkoxybenzenes, quinoxalines, phthalocyanines, porphyrins, pyrazines, and combinations thereof.

6. The RFB of claim 1, wherein the first redox couple comprises a redox active inorganic compound.

7. The RFB of claim 6, wherein the redox active inorganic compound is selected from the group consisting of sulfur and sulfur compounds, selenium and selenium compounds, iodides and polyiodides, bromides and polybromides, chlorides and polychlorides, and combinations thereof.

8. The RFB of claim 6, wherein the redox active inorganic compound comprises $Li_xS_y$, wherein x is from 0 to 4, and y is from 1 to 8.

9. The RFB of claim 1, wherein the first redox couple comprises a redox active organometallic compound.

10. The RFB of claim 9, wherein the redox active organometallic compound comprises a ferrocene compound.

11. The RFB of claim 1, wherein the first redox couple has a concentration greater than 0.1 M in a liquid solvent.

12. The RFB of claim 1, wherein the first redox couple has a concentration greater than or equal to 0.5 M in a liquid solvent.

13. The RFB of claim 1, further comprising a hybrid electrode separator between the first electrode and the second electrode.

14. The RFB of claim 1, wherein the second electrode is in direct contact with the first electrode.

15. The RFB of claim 1, wherein the first electrode further comprises metalated carbon during charging and discharging of the redox flow battery.

16. The RFB of claim 1, wherein the first electrode further comprises metal ions intercalated therein, deposited thereon, or both.

17. The RFB of claim 16, wherein the metal ions comprise lithium ions.

18. The RFB of claim 1, further comprising a reservoir containing a supply of the first redox couple dissolved in the solution or contained in the suspension, the reservoir connected to the first half cell via a conduit and a flow regulator.

19. The RFB of claim 1, wherein the second half cell further comprises a fluid circulator to induce flow in an electrolyte in the second half cell.

20. A redox flow battery (RFB) having a first half cell comprising a first redox couple dissolved in a solution or contained in a suspension at a concentration greater than 0.1 M, a second half cell comprising a solid hybrid electrode, and a separator or membrane between the first and second half cells, the hybrid electrode comprising a first electrode connected to a second electrode, thereby resulting in an equipotential between the first and second electrodes, wherein the first electrode comprises a carbon electrode as a conductive solid material and the second electrode comprises a lithium as an electroactive metal.

21. A method of operating an RFB having a first half cell comprising a first redox couple dissolved in a solution or contained in a suspension, a second half cell comprising a solid hybrid electrode, and a separator or membrane between the first and second half cells, the method comprising the step of operating a first electrode and a second electrode at an equipotential, wherein the hybrid electrode comprises the first electrode connected to the second electrode, the first electrode comprises a carbon electrode as a conductive solid material, and the second electrode comprises a lithium as a solid electroactive metal.

22. The method of claim 21, wherein the first electrode comprises a carbonaceous material selected from the group consisting of graphite, hard carbon, carbon black, graphite felt, carbon nanotubes, carbon fibers, graphene, and combinations thereof.

23. The method of claim 21, wherein the second electrode further comprises a metal selected from the group consisting of Na, K, Zn, Si, Mg, Ca, Al, Sn, Fe, and combinations thereof.

24. The method of claim 21, wherein the first redox couple comprises an organic compound.

25. The method of claim 24, wherein the organic compound is selected from the group consisting of TEMPO, anthroquinones, DBBB, sulfides, disulfides, polysulfides, nitroxyl radicals, galvinoxyl radicals, carbonyl compounds, quinones and quinone derivatives, TEMPO, metallocenes ferrocenes, carbazoles, tertiary amines, 2,5-di-tert-butyl-1,4-dialkoxybenzenes, quinoxalines, phthalocyanines, porphyrins, pyrazines, and combinations thereof.

26. The method of claim 21, wherein the first redox couple comprises an inorganic compound.

27. The method of claim 26, wherein the inorganic compound is selected from the group consisting of sulfur and sulfur compounds, selenium and selenium compounds, iodides and polyiodides, bromides and polybromides, chlorides and polychlorides, and combinations thereof.

28. The method of claim 27, wherein the inorganic compound comprises $Li_xS_y$, wherein x is from 0 to 4, and y is from 1 to 8.

29. The method of claim 21, wherein the first redox couple comprises a organometallic compound.

30. The method of claim 29, wherein the organometallic compound comprises a ferrocene compound.

31. The RFB of claim 1, wherein the first redox couple has a concentration greater than 0.1 M in a liquid solvent.

32. The RFB of claim 1, wherein the first redox couple has a concentration greater than or equal to 0.5 M in a liquid solvent.

33. The method of claim 21, further comprising metalating the first electrode with metal from the second electrode, thereby forming a metalated conductive material.

34. The method of claim 33, further comprising extracting metal ions from the second electrode through the metalated conductive material of the first electrode.

35. The method of claim 33, wherein the first electrode comprises a carbonaceous material, and the metalated conductive material comprises $LiC_6$.

36. The method of claim 21, further comprising intercalating metal ions in the first electrode, depositing metal ions on the first electrode, or both.

37. The method of claim 21, further comprising controllably flowing the first redox couple dissolved in the solution or contained in the suspension from a reservoir to the first half cell via a conduit and a flow regulator, the reservoir containing a supply of the first redox couple dissolved in the solution or contained in the suspension.

38. The method of claim 21, further comprising circulating an electrolyte in the second half cell.

\* \* \* \* \*